UNITED STATES PATENT OFFICE.

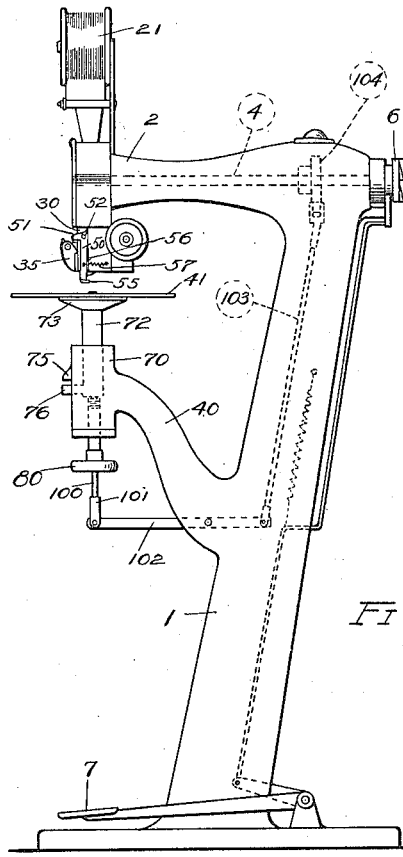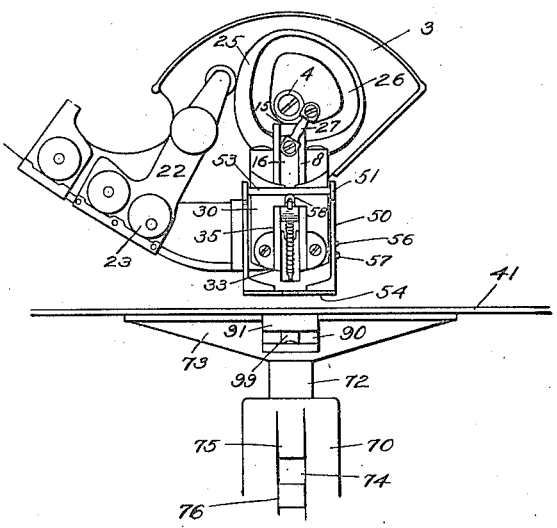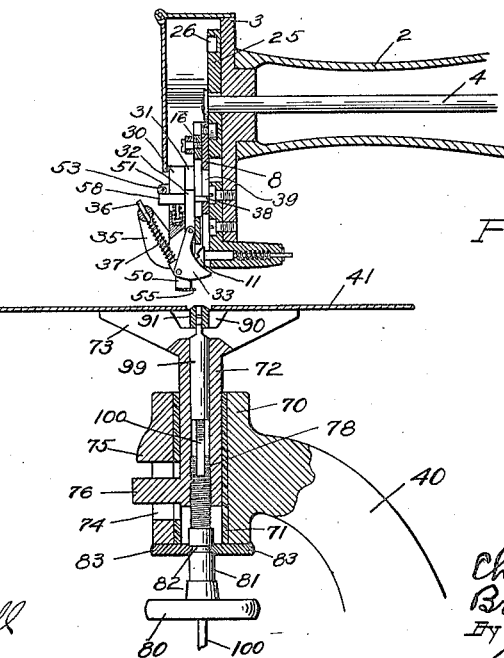

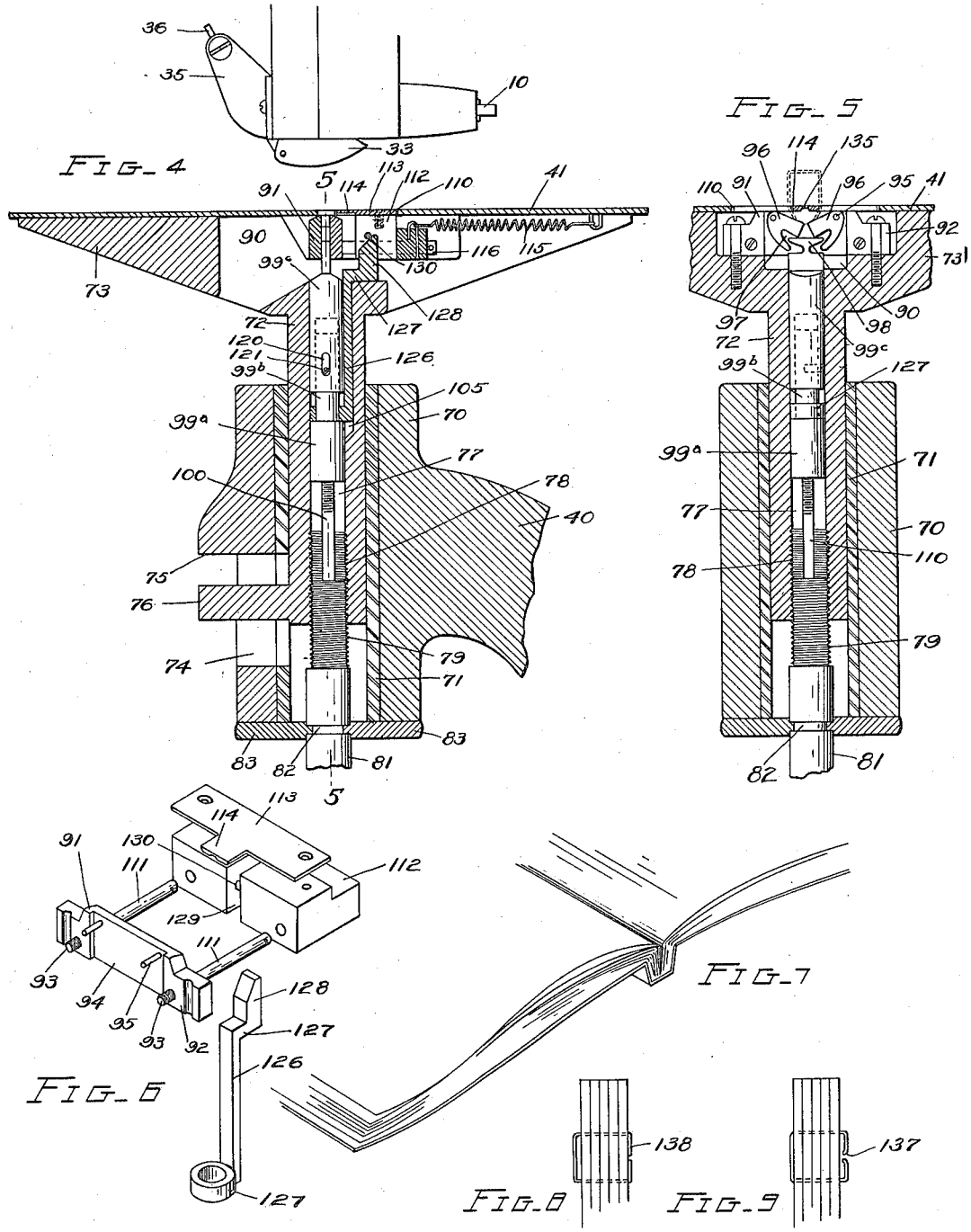

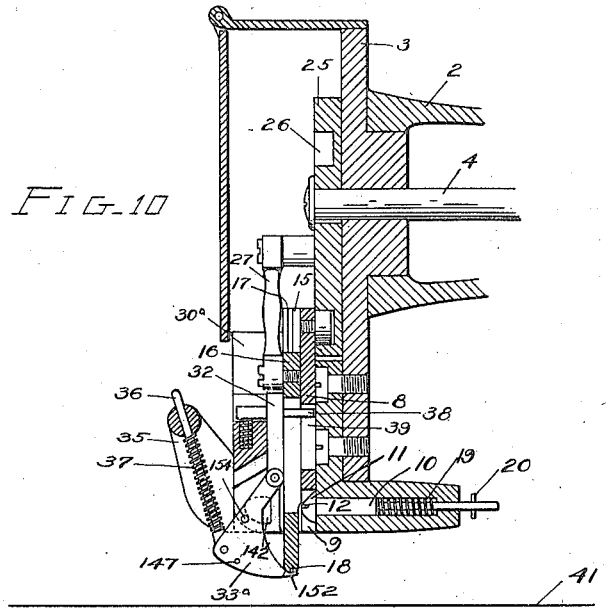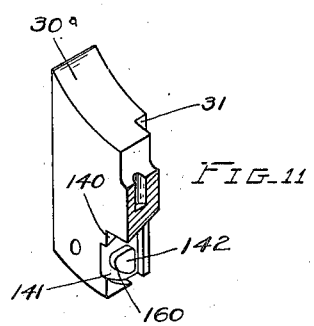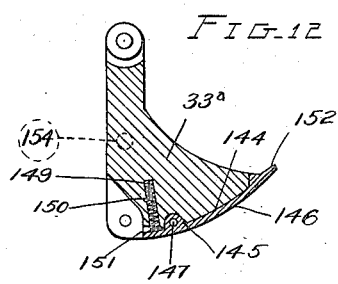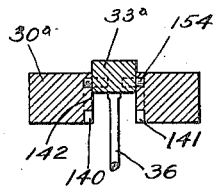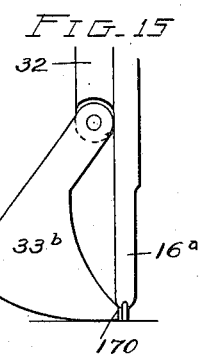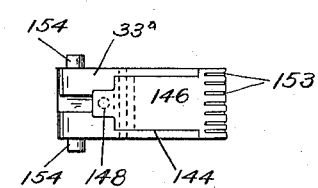

CHARLES W. MEARS AND BRENNAN B. WEST, OF CLEVELAND, OHIO; SAID WEST ASSIGNOR TO SAID MEARS.

MACHINE FOR STITCHING BOOKS.

1,152,534.　　　　　Specification of Letters Patent.　　Patented Sept. 7, 1915.

Application filed December 8, 1911. Serial No. 664,635.

*To all whom it may concern:*

Be it known that we, CHARLES W. MEARS and BRENNAN B. WEST, both of us residing at Cleveland, in the county of Cuyahoga and State of Ohio, have invented a certain new and useful Improvement in Machines for Stitching Books, of which the following is a full, clear, and exact description, reference being had to the accompanying drawings.
This invention relates to a machine for stitching books whereby wire staples can be inserted whose length after the legs have been bent into place is slightly greater than the thickness of the back of the book, thus allowing a certain movement between the adjacent leaves.

In the co-pending application filed Oct. 17, 1911, Ser. No. 655,178 by Charles W. Mears is disclosed and claimed a book formed of leaves which have been provided with a hinge portion adjacent to the rear edge thereof and which have been subsequently secured together with long staples inserted through the portions of these leaves at the rear of the hinge portion.

It is our expectation that the machine which forms the subject of this invention will find its widest use in connection with books the leaves of which have been treated in this manner, but it is obvious that the machine could be employed for attaching staples of the kind described into any form of book or pad of paper which might be desired without reference to the breaking of the leaves as described in that application.

The object of the invention is to provide a machine which shall be fitted to accomplish the application of staples in the manner described and without undue complexity of structure or delay in opertion; the provision of a machine of this character which can be operated without requiring any greater skill or attention on the part of the operator than machines of the nature now in use, and which shall not be liable to get out of order even in the hands of inexpert operators; and especially to provide mechanism which can be applied to existing machines to cause them to effect the purpose in view without requiring an excessive change in the construction of the machine as now produced; and further objects and advantages of the invention as will become apparent in the course of the following description.
Generally speaking our invention may be defined as consisting of the parts and elements recited in the claims annexed hereto and illustrated in the drawings accompanying and forming a part hereof wherein:

Figure 1 is a side elevation of a stitcher provided with means for limiting the insertion of the staples into a book or signature; Fig. 2, a front end view of the stitcher head, the cover being removed, a portion of the bed plate or work table being also illustrated; Fig. 3 is a longitudinal cross-sectional view through the stitcher head and work table illustrating the relation and interaction of the operating parts; Fig. 4 is a vertical cross sectional view of a modified form of work table provided with means adapted to be inserted betwen the clenched ends of the staple and the surface of the paper, a portion of a stitcher head of standard construction being shown in elevation; Fig. 5 is a cross sectional view taken along the broken line 5—5 of Fig. 4; Fig. 6 is a perspective view of the spacing plate and its coöperating parts together with certain of the mechanism for operating the same; Fig. 7 is a perspective view of a portion of a book made in accordance with my invention and stapled by either of the machines heretofore mentioned; Fig. 8 is an elevation of a portion of the back of a book stapled by means of the mechanism illustrated in Figs. 1 to 3 inclusive; Fig. 9 is a similar view of the back portion of a book stapled by means of the mechanism illustrated in Figs. 4 to 6 inclusive; Fig. 10 is a vertical cross-sectional view of a portion of a stitcher head, one of the members of which is modified according to another expedient so as to limit the insertion of the staple; Fig. 11 is a perspective view of a portion of the vertically slidable supporter-carrying block shown in Fig. 10, one half of the block being broken away so as to illustrate the method of imparting the desired motion to the supporter; Fig. 12 is a vertical cross-sectional view taken through the supporter shown in Fig. 10; Fig. 13 is a horizontal cross-sectional view taken along the line 13—13 of Fig. 10; Fig. 14 is a bottom view of the supporter illustrated in Fig. 12; and Fig. 15 illustrates still another expedient by means of which the insertion of a staple may be limited.

In general it will be observed that the result in view can be attained either by limiting the insertion of the staple to a point short of complete seating, or by interposing a spacing member between the staple and book, or by clenching the staple around a spacing member which is afterward withdrawn, the staple being in the last case completely inserted. The insertion of the staple can be limited either by a separate spacing member which is withdrawn immediately after the completion of the stitch as illustrated in Figs. 1 to 3 inclusive, or by the provision of a spacing member upon the staple supporter together with means for actuating said supporter after the application of the staple so as to withdraw said spacing member as illustrated in Figs. 10 to 14 inclusive, or by simply limiting the movement of the driver to a point short of the surface of the book or signature as illustrated in Fig. 15. The forming of the clenched portions around a spacing member, and the subsequent withdrawal of the spacing member requires a part which is separate from any part now present on any stitcher so far as we are aware, and the formation of this part and the method of operating the same may be very widely varied, although the embodiment illustrated in Figs. 4 to 6 inclusive will illustrate the general idea.

Describing the parts by reference characters 1 represents the standard of a conventional type of stitcher. The upper end of this standard is formed with a horizontal arm 2 provided at its forward end with a vertical plate 3 in which is journaled a horizontal drive shaft 4 having at its outer end a loose pulley 5 adapted to be connected with the shaft by means of a clutch 6 actuatable by a pedal 7 so as to impart to said shaft a single rotation at each depression thereof. Vertically reciprocable in a suitable guide way carried by the plate 3 beneath the shaft 4 is a former 8, having its lower end provided with a parallel-sided vertical notch 9, whose width is substantially equal to the width of the staple to be applied; and horizontally slidable in a guide way normal to the guideway of the former is a shank 10 having at its forward end the anvil 11. The head of this anvil is of double-wedge shape, as shown in Figs. 3 and 10, and is formed at the apex with a horizontal groove 12. The forward face of the former 8 is formed with a vertical guideway 15 in which is reciprocably mounted a driver 16, said driver being formed with lateral tongues, (not shown) received in vertical grooves 17 formed in the sides of the guideway 15. The width of the guideway 15 is substantially equal to that of the notch 9 and anvil head 11, and the lower edge of the driver is provided with a slot 18 adapted to receive the wire head or crown of the staple. By the action of a spring 19 and pin 20, the anvil head 11 is normally maintained in such position that the bottom of its slot 12 will lie exactly in the path of the slot 18 of the plunger, and in this position, said slot 12 registers with a suitable aperture (not shown) in the side of the stitcher head through which wire is fed from a spool 21. The stitcher head also carries a pivoted arm 22 having thereon a gripper member 23 and adapted to be moved forward at stated times to grip the wire and advance it into the notch 12 of the anvil.

In its most usual form, the end of the shaft 4 is provided with a rotatable member 25 having a cam slot 26 shaped to impart the proper motion to the former 8, and having pivoted to its face within said groove a link 27 adapted to impart the proper movement to the driver 16, the cam slot and link being so arranged as to operate these parts in proper phase. The exterior face of the member 25 is shaped so as to actuate the lever 22 at proper intervals. Secured to the plate 3 forward of the driver 16 is a fixed block 30 having upon its inner face a vertical guide-way 31, and slidable in this guide way is the supporter block 32 having the approximately triangular supporter 33 pivoted to the lower end thereof. A bracket 35 secured to the block 30 carries a guide bar 36 by means of which the supporter is steadied, and a spring 37 whereby it is pressed against the driver. The block 32 is provided with a pin 38 projecting through an elongated opening in the driver and into a slot 39 in the former.

Below the arm 2 is a second arm or bracket 40 carried by the stitcher standard and supported in the end of this arm is a vertically adjustable table 41 upon which the books are supported while being stapled, and which contains the clenching mechanism which will be specifically described hereinafter but which is not necessary to be considered in detail so far as concerns the parts above described, it being merely understood that some form of clencher is provided for bending over the legs of the staples.

The operation of the machine so far described is as follows: The table 41 having been adjusted to the proper height and the treadle 70 pressed, the arm 22 is actuated so as to advance the proper length of wire into the slot 12 of the anvil head; this wire is severed by a suitable knife (not shown); the former 8 is depressed so as to bend downwardly the ends of the wire strand which will now lie in the grooves 17 and project downwardly toward the book, the middle portion thereof being still detained within the slot 12; and the driver 16 then depressed so as to wedge the anvil out of the way and transfer the wire staple from the groove 12 to the groove 18. The staple is prevented from falling out of the groove 18 by the supporter 33 which closes the opening thereof, though its peculiar shape causes it to be wedged aside by the downwardly moving driver so as not to interfere with the operation of the machine. It will be noted that the depression of the former 8 has permitted the supporter block 32 to fall until the supporter 33 has reached the surface of the book so that the supporter is in a position to coöperate with the driver until the staple has been completely inserted, and that when the driver is raised it will again engage the pin 38 thus lifting the supporter away from the table. All the parts of the machine so far described are old and well known and are of constant use in the arts, but we have deemed it essential to describe the operation thereof thus in detail in order to render intelligible the adaption of our improvements thereto, one embodiment of which will now be described. Pivoted to each side of the block 30 is a bell crank lever having an elongated vertical arm 50 and a comparatively short horizontal arm 51. The pivots are shown at 52 and are placed in the same vertical plane as the guideway 31 and in substantially the same horizontal plane as the pin 38. The arms 51 are connected by means of a cross bar 53 extending past the face of the block 30, and the lower ends of the arms 50 are connected by a plate 54 having at its rearward side a projecting tongue 55, said tongue being of a thickness to space the staple from the book the desired distance and of a width substantially to fill the staple. A pin 56 serves to limit the rearward movement of the arms 50 to a point which will bring the tongue 55 exactly into the path of the driver 16, and a spring 57 tends to hold these arms against these pins. The supporter block 32 is provided with a pin 58 adapted to engage the cross bar 53 when the block is raised to its highest point. The operation of this device is as follows: The height of the table 41 is adjusted so that the books to be stitched will fit snugly between the upper surface of the same and the bottom of the plate 54. Upon the beginning of the movement which results in the insertion of a staple the wire is advanced as heretofore described and the former depressed so as to bend the staple and permit the supporter block to drop. The spring 57 draws the arms 50 rearwardly so as to interpose the tongue 55 into the path of movement of the staple with the result that the supporter 33 will come to rest against the upper surface of the plate 54 instead of upon the top of the book. The stitch is now applied in the usual manner excepting that the staple incloses the tongue 55, but the upward movement of the staple former raises the block 32 and with it the pin 58 which strikes against the cross bar 53 and kicks the arms 50 forwardly withdrawing the tongue from the staple and freeing the book.

In the meantime the lower ends of the staple have been clenched in the usual or any convenient manner.

Although the method of clenching the staples employed by the preceding embodiment of my invention is unimportant and although the method of interposing and withdrawing a spacing member in the case of the embodiment now to be described will be largely the same irrespective of the operation of the clenching apparatus, we deem it desirable to explain the clenching apparatus rather in detail, especially because of the somewhat intimate connection therewith of the spacing means illustrated in Figs. 4, 5 and 6 hereof. Carried by the forward end of the bracket 40 is a vertical sleeve 70 preferably pushed as at 71 and having a vertical post 72 slidable therein carrying at its upper end a flat topped enlargement 73 to the upper surface of which is secured the table-top proper 41. The forward side of the sleeve 70 is formed with a vertical slot 74, the upper edge of which is provided with an outwardly extending jaw 75, and the post 72 is provided with a forwardly projecting jaw 76 opposite to the fixed jaw. The post 72 is formed with a longitudinal bore 77, the lower end of which is threaded as at 78 for the reception of the threaded end 79 of the hub 81 of an adjusting wheel 80, the hub 81 whereof is formed with a circumferential groove 82 whereby it may be rotatably but non-translatably secured in the plates 83—83 carried by the lower end of the sleeve 70. The distance between the jaws 75 and 76 is the same as the thickness of the book which is to be stapled thus facilitating the adjustment of the machine.

In the embodiment illustrated herein, the middle portion of the enlargement 73 is hollowed out as at 90, and secured in this hollow portion are a pair of jaws 91—91. These jaws have meeting portions 92 at their ends which are clamped in close engagement as by screws 93—93, but the middle portion of the jaws is hollowed out as at 94 so as to form when two are assembled a vertical rectangular recess parallel to the driver 16. Pivoted in this recess as by pins 95 are the clenching dies 96—96 illustrated in Fig. 5. The pins 95 are spaced outside of the legs of the staple and the length of each of the dies is such as to cause them to substantially abut at the center of the jaws. The adjacent faces of the die members are usually provided with notches 97 adapted for the reception of a head 98 formed on the upper end of a reciprocable member 99. In the embodiment illustrated in Figs. 1, 2, and 3 hereof, the lower end of this member is provided with internal screw threads of the same pitch as the threads 78 in the post, and meshing with these threads in the threaded end of a rod 100 which is reciprocably but non-rotatably sleeved in the hub 81 and shank 79 of the hand wheel 80. This rod is provided with a swivel 101 which is in turn articulated to a lever 102 actuated at suitable intervals through a link 103 by a cam 104 on the shaft 4. With this construction it will be obvious that the height of the table and of the dies can be changed merely by rotating the handle 80 and without disturbing the method of operation thereof. The construction of the clenching mechanism and table so far described is old, but a description thereof is believed to be essential to the proper understanding of the operation of the embodiment of our invention now to be described.

Referring to Figs. 4 and 5 it will be seen that the table 41 is provided with a slot 110, and the jaw members 91 with a pair of parallel horizontal guide rods 111—111 here shown as formed upon continuations of the screws 93. Slidably mounted upon these rods is a block 112 to the upper face of which is secured a flat plate 113 having at its forward end a tongue 114, the upper surface of which is preferably substantially flush with the top of the table 41, the width of which is not greater than the inside width of the staple, and the thickness whereof corresponds to the amount of space desired between the clench staple end and the book. The jaw members are illustrated in this modification as depressed below the surface of the table by an amount substantially equal to the thickness of the tongue 114 instead of being substantially flush therewith as in Figs. 1, 2, and 3. A spring 115 tends to hold the block at the extreme end of the guide rod with the tongue 114 out of register with the dies. The rod 100 appears as before, but the member 99 is made in two parts, the lower 99$^a$ being threadedly connected with the rod 100 as before, but having a reduced upper end 99$^b$ which is slidably received in a vertical recess formed in the lower end of the upper part 99$^c$. The lower portion of the part 99$^c$ is formed with a laterally opening vertical slot 120 and the end 99$^b$ with a pin 121 projecting into the same, whereby a lost-motion connection is provided between these parts, the length of the slot 120 and the position of the pin 121 being such as to confine this lost motion within proper limits while keeping the adjacent ends of the parts 99$^a$ and 99$^c$ always spaced apart. The upper end of the bore 77 is formed at its upper end with a lateral enlargement 105 just beneath the block 112, and in this enlargement is mounted a slidable bar 126 preferably having its lower end formed with a collar 127 receiving the reduced end 99$^b$ of the member 99$^a$ and rigidly secured thereto as by a pin. The upper end of this bar is offset as at 127 and formed with an upwardly projecting wedge head, the block 112 being suitably slotted as at 129 for the reception of this head and provided with a transverse pin 130 against which the wedge portion of the head can bear as shown in Fig. 4. The stitching-head portion of the machine is the same as the standard head heretofore described and is adjusted and operated in the usual manner. At a proper interval after the insertion of each staple the rod 100 is raised in the usual manner, but the lost motion between the parts 99$^a$ and 99$^c$ permits the actuation of the wedge head 128 to advance the block 112 and tongue 114 into operative position previous to the movement of the part 99$^c$ to clench the staples, whereby the staple is clenched around this tongue instead of being bent directly against the book. As soon as the rod 100 is released the different parts reassume the position shown in Fig. 4.

In order to prevent the free ends of the staple from being left where they may become entangled with surrounding objects or lacerate the hands of a reader, we preferably form the lower surface of the tongue 114 with a groove 135. In the clenching operation the extreme ends of the staples are generally first bent and then the entire leg of the staple inclined into place. The notch of 135 then receives the hooked end of the staple, the final result being that shown in Fig. 9 hereof, wherein the different signatures of the book are indicated, and the inturned or hooked ends of the staples at 127. In Fig. 8 we have illustrated the condition of the same when the staple is inserted by the mechanism illustrated in Figs. 1 to 3 hereof, the clenched end of the staples being substantially straight as shown at 138. It will be noted that the machines so far described operate to form the extra length of the wire staples on opposite sides of the book. This is not of particular importance from the fact that the extra length of the wire staples is almost immediately taken up by the paper so that the ends of the stitches do not protrude to the inconvenience of the reader. Indeed, as soon as the book is made, the tendency of the paper is to expand so as to take advantage of the space allowed it by the staples and this taken in connection with the simple turning of the leaves in reading tends to bring the added length of the staples or stitches into the place where the book is open, the book then assuming the form illustrated in Fig. 7 thereof.

In Figs. 10 to 14 inclusive we have illustrated a third modification of the machine whereby the added length of the staples may be obtained. In this embodiment the parts 2 to 29 inclusive are the same as those heretofore described. The block 30 however is replaced by a block 30$^a$ of exactly the same construction excepting that the slot 140 in which the supporter swings is formed at each side with grooves 141 defining a central boss or projection 142. This block is formed with a guide way 31 as before, in which is slidably mounted the supporter block 32, likewise provided with a pin 38 projecting through the driver and into the slot 39 in the former. To the lower end of this block is pivoted a supporter 33ª which is exactly the same as that heretofore illustrated and described with the exception that a portion of the face thereof is provided with the shallow uniform recess 144 and with a transverse groove 145 near the heel of the supporter merging with said recess. Mounted in said recess is a flat curved plate 146 having a thickened rib received in the groove 145, said rib being formed with a longitudinal perforation registering with suitable apertures in the sides of the supporter and receiving a pivot hinge 147 by means of which the plate is secured in place. The heel of the plate is formed with a projection 148 beyond this pivot and the body of the supporter with a socket 149 receiving a spiral spring 150 pressing against said heel, whereby the forward portion of the plate is maintained snugly against the bottom of this recess. The portion of the recess beneath the heel 148 is beveled away as at 151 so as to permit the heel to move thereinto a predetermined distance against the force of the spring. The forward end of the plate is widened to the same width as the supporter and formed into a toe portion 152, the top and bottom sides whereof are substantially parallel and the length whereof is substantially equal to the thickness of the driver as shown in Fig. 10. The bottom of this toe portion is preferably formed with a plurality of spaced longitudinal grooves 153. The sides of the supporter are formed with laterally projecting studs 154—154.

The operation of the device is as follows: The action of the machine as a whole is exactly the same as described in connection with Figs. 1 to 3 with the exception that the supporter 33 in Fig. 1 is forced completely from beneath the driver at the conclusion of each attaching stroke, the lower end of the driver being advanced clear to the surface of the tongue, whereas in the present embodiment the driver is spaced from the paper at the limit of its stroke by means of the toe 152. In the embodiment shown in Fig. 1, the supporter merely swings forward again upon the retraction of the driver, but in the present instance it is necessary to impart an initial movement in the opposite direction prior to the forward swing of the same in order that this toe may be removed from the staple. This result is effected by means of the boss 142. In the present embodiment the supporter falls from its uppermost position to its lowermost position as before, the studs 154 passing between the boss 142 and the driver 16 until the plate 146 rests upon the surface of the paper when these studs will have passed the lowermost portion of this boss. The downward movement of the driver will now wedge the supporter rearwardly as before, the studs 154 moving about the bottom surface of this boss which is formed for a considerable distance upon the arc of movement of these studs. When the driver has reached the lowermost point of its movement these studs will have been moved past the arcuate portion of the boss to a point (indicated at 160 in Fig. 11) where the inclination thereof to the radius of the supporter is less than ninety degrees, so that upon the return movement of the block 32 caused by the pin 38 the supporter 33ª will be drawn forwardly a sufficient distance to free the toe from the staple, the necessary vertical movement of the supporter relative to the toe being permitted by the loose connection between the plate 146 and the supporter body. As soon as the toe has left the staple the spring 150 will return the plate 146 to its position within the recess 144, and as soon as the studs 154 have reached the top of the boss 142 the supporter will again swing rearwardly under the influence of the spring 37 so as to permit a succeeding operation of the machine. In Fig. 15 we have illustrated a still further and yet simpler expedient for performing the same function, wherein the spacing member is entirely dispensed with. In this embodiment we have illustrated a driver 16ª of less length than those usually employed, the driver shown herein being illustrated in its extreme lowermost position. The supporter 33ᵇ terminates abruptly as at 170 so that when the driver is retracted it will be impossible for the tip thereof to catch in the staple. The other parts of this mechanism being the same as those of the standard machine, a further description thereof is believed to be unnecessary.

While we have necessarily described our invention in detail and illustrated those embodiments thereof which appear most advantageous at the present time, it is obvious that still other embodiments can be devised, and that many of the advantages thereof can be attained by the use of specifically different mechanism. All of these variations and modifications we consider within the scope of our inventive idea so far as the same are comprised within the terms of the claims hereto annexed.

Having thus described our invention, what we claim is:—

1. In a device of the character described, the combination, with means for supporting a book or signature, of means for driving a staple thereinto, means for preventing the bending of said staple during the driving operation, a pivoted member having a spacing projection to be included in said staple when the same has been completely applied, and means operated by the return movement of said bending preventing means for withdrawing said projection from said staple.

2. In a device of the character described, the combination with means for supporting a book or signature, of means for guiding a staple to said book or signature, means for driving said staple thereinto, a spacing member adapted to be interposed between the legs of said staple to space the crown thereof from said book, means for maintaining said staple in engagement with said driving means during the driving motion thereof, means for returning said maintaining means to initial position, and means actuated by the returning movement of said maintaining means for withdrawing said spacing member from said staple.

3. In a machine for stitching books, the combination, with means for supporting a book or signature, of means for guiding a staple to said book or signature, a driver for inserting said staple thereinto, a reciprocable member mounted at one side of said driver and movable in a direction parallel thereto, a pivoted member carried by said reciprocable member and having a spacing tongue, means for maintaining said tongue in a position to be inclosed by said staple during the driving operation, said reciprocable member being arranged to advance prior to the driving operation so as to move said pivoted member into contact with said book, means for withdrawing said tongue from said staple after the completion of the driving operation, and means for withdrawing said reciprocable member so as to remove said pivoted member from the book.

4. In a device of the character described, the combination with means for supporting a book or signature, of means for guiding a staple to said book or signature, means for driving said staple thereinto, means for maintaining said staple in engagement with said driving means during the driving motion thereof, a spacing member carried by said maintaining means for limiting the insertion of said staple, means for withdrawing said spacing member from said staple, and means for returning said maintaining means to initial position.

5. In a device of the character described, the combination, with means for supporting a book or signature, of means for guiding a staple to said book or signature, means for driving said staple thereinto, a supporting member for maintaining said staple in engagement with said driving member during the driving operation, a toe carried by the end of said supporting member so as to be included in said staple when the same has been completely applied and means for imparting to said supporting member an initial rearward motion simultaneously with the retraction of said driving means, whereby said toe is removed from said staple.

6. In a machine for stitching books, the combination, with means for supporting a book or signature, of means for guiding a staple to said book or signature, a slotted driver for inserting said staple thereinto, a slidable block mounted at one side of said driver and slidable in a direction parallel thereto, a cam shaped supporting member pivoted to said block and having its cam face extending past the slot on said driver whereby said staple is retained in said slot during the driving operation and said supporting member simultaneously wedged to one side, a spacing member attached to said supporting member and adapted to be included in said staple when the same has been fully inserted whereby the crown of said staple is spaced from said book, a block slidably mounted parallel to said driver, means for permitting the forward movement of said block and supporter previous to the forward movement of said driver, means for imparting a reverse movement to said block after the completion of the driving operation, and means for imparting to said supporter an initial sidewise movement away from said driver whereby said spacing member is withdrawn from said staple.

7. In a machine for stitching books, the combination, with means for supporting a book or signature, of means for guiding a staple to said book or signature, a slotted driver for inserting said staple thereinto, a slidable block mounted at one side of said driver and slidable in a direction parallel thereto, a cam shaped supporting member pivoted to said block and having its cam face extending past the slot on said driver whereby said staple is retained in said slot during the driving operation and said supporting member simultaneously wedged to one side, a spacing member yieldingly attached to said supporting member and adapted to be included in said staple when the same has been fully inserted whereby the crown of said staple is spaced from said book, a block slidably mounted parallel to said driver, means for imparting a forward movement of said block and supporter previous to the forward movement of said driver, means for imparting a reverse movement to said block after the completion of the driving operation, and cam means for imparting to said supporter an initial sidewise movement away from said driver whereby said spacing member is withdrawn from said staple.

8. In a machine for stitching books, the combination, with means for supporting a book or signature, of means for guiding a staple to said book or signature, a slotted driver for inserting said staple thereinto, a slidable block mounted at one side of said driver and slidable in a direction parallel thereto, a cam shaped supporting member pivoted to said block and having its cam face extending past the slot on said driver whereby said staple is retained in said slot during the driving operation and said supporting member simultaneously wedged to one side, a pivoted member carried by the machine head and having a tongue, means for maintaining said tongue in a position to be inclosed by said staple during the driving operation, means for permitting the forward movement of said block and supporter in advance of the driving operation, means for withdrawing said block and supporter at the conclusion of the driving operation, and means actuated by the return movement of said block for withdrawing said tongue from said staple.

In testimony whereof, we hereunto affix our signatures in the presence of two witnesses.

CHARLES W. MEARS.
BRENNAN B. WEST.

Witnesses to Charles W. Mears:
O. T. BAUCHMAN,
W. J. WARD.

Witnesses to Brennan B. West:
ALBERT H. BATES,
HAROLD S. SMITH.